UNITED STATES PATENT OFFICE.

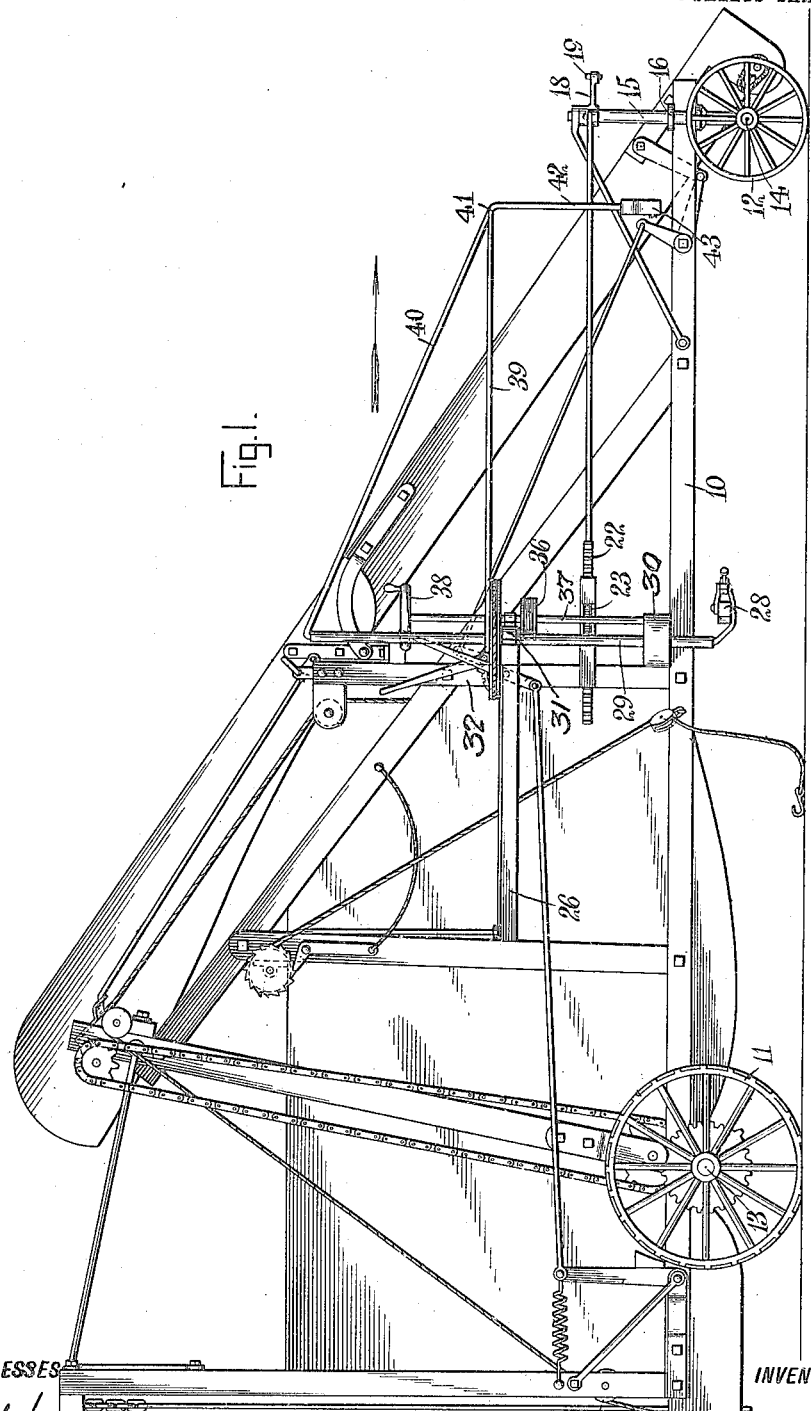

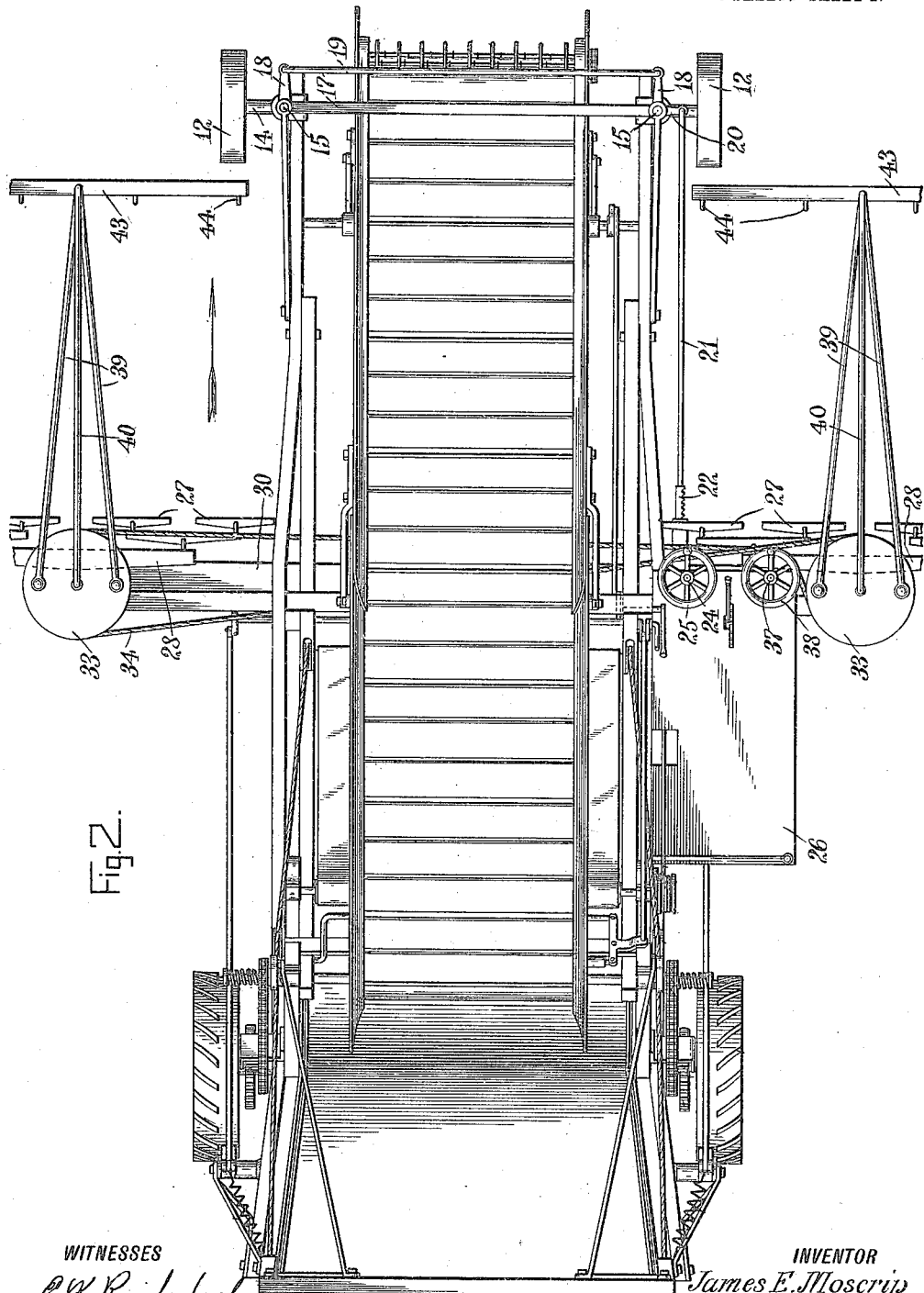

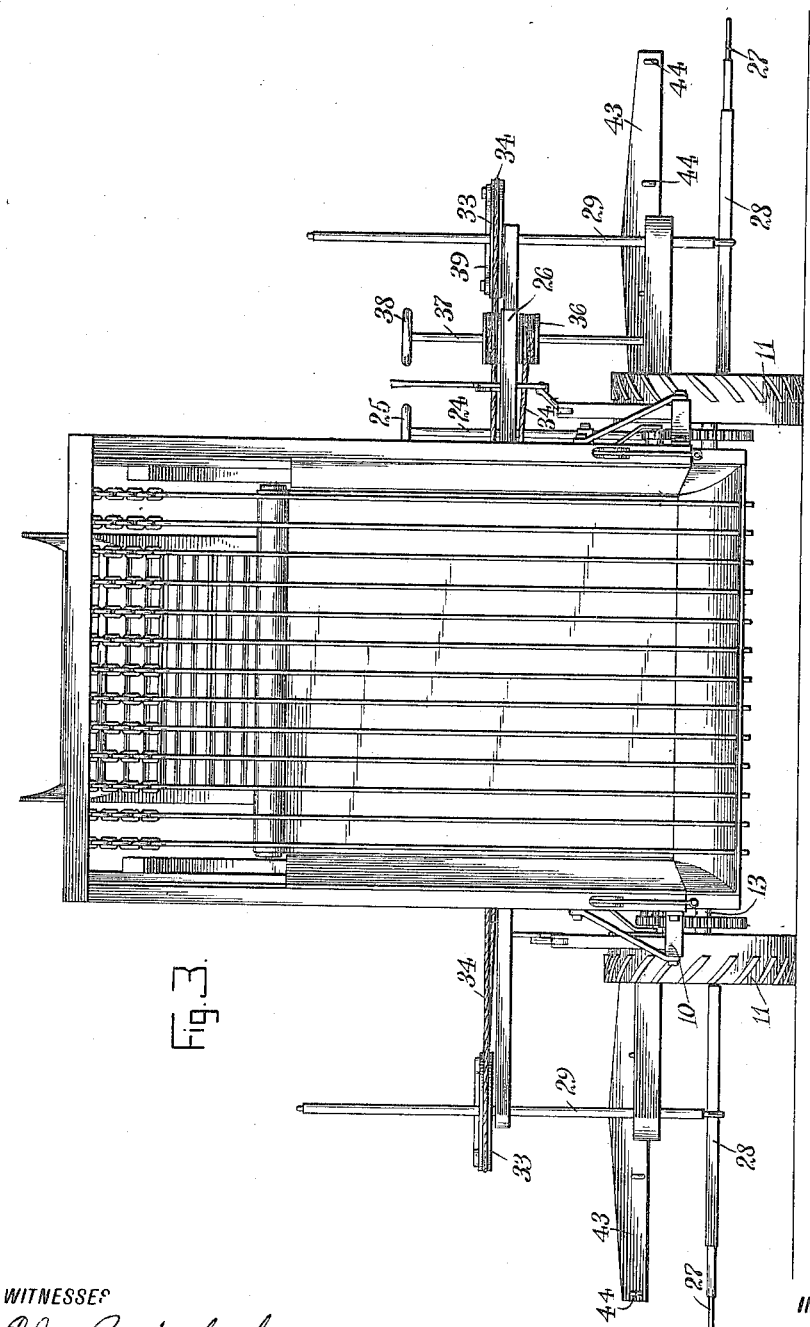

JAMES EDWARD MOSCRIP, OF DERRICK, SASKATCHEWAN, CANADA.

DRAFT APPLIANCE FOR SELF-LOADING GRAIN-CARRIERS.

1,135,835. Specification of Letters Patent. Patented Apr. 13, 1915.

Application filed July 17, 1913. Serial No. 779,424.

*To all whom it may concern:*

Be it known that I, JAMES E. MOSCRIP, a subject of the King of Great Britain, and a resident of Derrick, in the Province of Saskatchewan and Dominion of Canada, have invented a new and Improved Draft Appliance for Self-Loading Grain-Carriers, of which the following is a full, clear, and exact description.

This invention relates to harvesting machinery and has particular reference to propelling means or draft appliances for machinery intended for the purpose of gathering a load or bulk of hay or shocks of grain while moving across a field and then transporting such load or bulk to the place of delivery.

The primary object of this invention is to provide a machine adapted to be propelled across a field in any direction and while in transit to load itself automatically with grain or hay, and then for the propelling means or draft appliances to be reversed so that the machine with its load may be projected into close proximity to a threshing machine or other place where the load may be deposited.

The foregoing and other objects of this invention will hereinafter be more fully described and claimed and illustrated in the drawings forming a part of this specification in which like characters of reference indicate corresponding parts in all the views, and in which—

Figure 1 is a view in elevation of the right side of the machine regarding the gathering end thereof as the front; Fig. 2 is a plan view of the same; and Fig. 3 is a rear elevation.

The several parts of the invention may be made of any suitable materials, and the relative sizes and proportions, as well as the general design of the machine, may be varied to a considerable extent without departing from the spirit of the invention hereinafter more fully set forth and specifically claimed.

The machine comprises a main horizontal frame 10 supported upon master wheels 11 and steering wheels 12. The master wheels 11 are mounted upon a driving axle 13 beneath the rear end of the machine which carries the major portion of the load. Each of the front or steering wheels is journaled upon an axle 14 extending laterally from a vertical shaft 15 journaled at 16 at the front end of the frame 10. The upper ends of the shafts 15 are journaled in the ends of a bar 17 which serves to steady this portion of the device and each of said shafts is provided at or near its upper end with an arm 18. The arms 18 of the shafts extend forwardly parallel to each other and are maintained in such relation by means of a connecting rod 19. The arm 18 at the right side of the machine has a bell crank connection at 20 with a steering rod 21 extending rearwardly therefrom and to which is attached a rack 22 adapted to be reciprocated by means of a pinion 23 connected to a vertical steering shaft 24 having a hand wheel or the like 25 at its upper end within easy reach of an operator stationed upon a platform 26 at the right side of the machine.

The means for propelling this machine, as illustrated, comprises provision for eight horses arranged four abreast on each side of the machine. The horses are hitched to whiffletrees 27 and they in turn with eveners 28 and movable around the vertical axis of a shaft 29 journaled in a transverse beam 30 extending across the machine above the base frame 10, and also provided with bearings in a beam 31 higher up and connected to upright members 32 of the frame. Each of the shafts 29 has secured to it what I may term a turntable 33 having a peripheral groove fitted with a cable 34, a portion of which cable extends across the machine, and after engaging as described with the turntables on opposite sides of the machine, has its ends crossed and connected to a drum 36 connected to a vertical shaft 37, the operation of which is controlled by a hand wheel 38 from above the platform 26 above described. Extending forwardly from each turntable is a frame comprising two substantially horizontal members 39 and a single inclined member 40, all converging at 41 and thence extending downwardly forming a bar 42 which supports a leader bar 43. The frame 39, 40 is high enough and the leader bar 43 is long enough to accommodate four horses abreast, and the horses are tied to rings or staples 44 secured to the bar.

The arrangement of the turntables and the manner of hitching the horses thereto are such that the party in control of the machine on the platform, by turning the shaft 37 by means of the hand wheel 38, will cause both teams of horses to swing around the axes of the shafts 29 through an arc of substantially 180 degrees, both teams turning simultaneously due to the peculiar connection of a cable 34. After a load has been gathered by the machine, while the horses are headed in one direction herein specified as the forward direction, the horses may be turned about so as to be headed in the opposite direction causing the rear end of the machine to move in advance of the gathering end. By this means I am able to cause the machine to be brought into close proximity to a threshing machine or other place of deposit.

Having thus described my invention, I claim as new and desire to secure by Letters Patent:—

1. In a machine of the class set forth, the combination of a frame, a pair of turntables pivoted upon opposite sides of the frame, draft means connected to the turntables for operating the machine in one direction, and means for swinging the turntables simultaneously in opposite directions through angles of substantially 180 degrees for operating the machine in the opposite direction.

2. In a machine of the class set forth, the combination of a frame, supporting means for the frame adapting it to operate in either a forward or a rearward direction, a pair of pivoted members upon opposite sides of the frame, draft means connected to the several pivoted members for operating the machine in one direction, and means for swinging the pivoted members simultaneously in opposite directions through angles of substantially 180 degrees for operating the machine in the opposite direction.

3. In a machine of the class set forth, the combination of a frame, supporting and steering devices for the frame, a pair of rock shafts pivoted vertically on opposite sides of the frame, traction means connected to the lower ends of said rock shafts, a leading bar 43 supported from the upper portion of each rock shaft and in front of the traction means associated therewith, and means operated from the frame to cause the leading bars and traction means to be swung outwardly from the frame and around through angles of substantially 180 degrees, substantially as set forth.

4. In a device of the character set forth, the combination of a main frame, supporting and steering devices therefor, traction means connected on vertical pivots on opposite sides of the frame, a turntable above each traction means, a leading bar in front of each traction means, a cable operating around said turntables and extending across the main frame, and means operated from the main frame to actuate the cable to cause the traction means and leading bars to be swung simultaneously around so as to reverse the direction of movement of the machine.

5. The combination with a main frame and supporting and guiding means therefor, of traction devices on each side of the machine, each of said traction devices including a vertical shaft pivoted to the main frame, a turntable secured to said shaft in a horizontal plane, an evener secured to the lower end of the shaft, a supporting frame comprising a pair of bars leading forwardly from the turntable and an inclined bar leading forwardly from the top of the shaft and all of said bars converging at their front ends into a vertical bar, and a leading bar carried by said vertical bar, an endless cable extending across the main frame and extending in a horizontal plane around said turntables, and a friction drum engaging said cable to cause simultaneous rotation of the turntables, substantially as set forth.

In testimony whereof I have signed my name to this specification in the presence of two subscribing witnesses.

JAMES EDWARD MOSCRIP.

Witnesses:
   J. S. WITIUES,
   E. G. ELLECTON.

Copies of this patent may be obtained for five cents each, by addressing the "Commissioner of Patents, Washington, D. C."